(12) United States Patent
Rushton

(10) Patent No.: US 10,316,598 B2
(45) Date of Patent: Jun. 11, 2019

(54) VALVE SYSTEM FOR DISTRIBUTING ACTUATING FLUID

(71) Applicant: Schlumberger Technology Corporation, Sugar land, TX (US)

(72) Inventor: Guy James Rushton, Frocester (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 494 days.

(21) Appl. No.: 14/709,432

(22) Filed: May 11, 2015

(65) Prior Publication Data

US 2016/0002992 A1  Jan. 7, 2016

Related U.S. Application Data

(60) Provisional application No. 62/021,288, filed on Jul. 7, 2014.

(51) Int. Cl.
| | | |
|---|---|---|
| *E21B 21/10* | (2006.01) | |
| *E21B 3/00* | (2006.01) | |
| *E21B 7/06* | (2006.01) | |
| *F16K 11/072* | (2006.01) | |
| *F16K 31/12* | (2006.01) | |
| *F16K 11/076* | (2006.01) | |

(52) U.S. Cl.
CPC ............... *E21B 21/10* (2013.01); *E21B 7/06* (2013.01); *F16K 11/076* (2013.01)

(58) Field of Classification Search
CPC ...... F16K 11/072; F16K 31/12; F16K 11/076; E21B 21/10; E21B 3/00; E21B 7/06
See application file for complete search history.

(56) References Cited

U.S. PATENT DOCUMENTS

| | | | |
|---|---|---|---|
| 4,331,268 A | 5/1982 | Chisholm | |
| 4,637,479 A * | 1/1987 | Leising | ............... E21B 7/065 |
| | | | 175/61 |
| 5,113,953 A | 5/1992 | Noble | |
| 5,265,682 A | 11/1993 | Russell et al. | |
| 5,520,255 A | 5/1996 | Barr et al. | |
| 5,553,678 A | 9/1996 | Barr et al. | |
| 5,553,679 A | 9/1996 | Thorp | |
| 5,582,259 A | 12/1996 | Barr | |
| 5,603,385 A | 2/1997 | Colebrook | |
| 5,673,763 A | 10/1997 | Thorp | |
| 5,685,379 A | 11/1997 | Barr et al. | |
| 5,695,015 A | 12/1997 | Barr et al. | |
| 5,706,905 A * | 1/1998 | Barr | ..................... E21B 7/06 |
| | | | 175/61 |

(Continued)

OTHER PUBLICATIONS

International Search Report and Written Opinion issued in related International Application No. PCT/US2015/031294 dated Aug. 13, 2015 (12 pages).

*Primary Examiner* — D. Andrews
*Assistant Examiner* — Dany E Akakpo

(57) ABSTRACT

A technique facilitates delivery of high pressure actuating fluid, e.g. drilling mud, to a plurality of actuators. The technique employs a valve system in which high pressure actuating fluid is delivered from inside a rotor to outer stator ports on a surrounding stator. The construction and arrangement of the rotor and stator reduces the inherent instability and susceptibility to sticking that can otherwise affect the operation of the valve.

19 Claims, 6 Drawing Sheets

(56) References Cited

U.S. PATENT DOCUMENTS

| | | |
|---|---|---|
| 5,778,992 A | 7/1998 | Fuller |
| 5,803,185 A | 9/1998 | Barr et al. |
| 5,828,149 A | 10/1998 | Parmeter et al. |
| 5,971,085 A | 10/1999 | Colebrook |
| 6,089,332 A | 7/2000 | Barr et al. |
| 6,092,610 A | 7/2000 | Kosmala et al. |
| 6,158,529 A | 12/2000 | Dorel |
| 6,244,361 B1 | 6/2001 | Comeau et al. |
| 6,364,034 B1 | 4/2002 | Schoeffler |
| 6,394,193 B1 | 5/2002 | Askew |
| 2001/0052428 A1 | 12/2001 | Larronde et al. |
| 2002/0011359 A1 | 1/2002 | Webb et al. |
| 2012/0160563 A1* | 6/2012 | Clark ........................ E21B 7/06 175/61 |
| 2012/0160564 A1 | 6/2012 | Downton et al. |
| 2014/0014413 A1 | 1/2014 | Niina et al. |
| 2014/0169128 A1 | 6/2014 | Orban et al. |
| 2016/0251920 A1* | 9/2016 | Galley .................... E21B 34/08 175/25 |

\* cited by examiner

VALVE SYSTEM FOR DISTRIBUTING ACTUATING FLUID

CROSS-REFERENCE TO RELATED APPLICATIONS

The present document is based on and claims priority to U.S. Provisional Application Ser. No. 62/021,288, filed Jul. 7, 2014, which is incorporated herein by reference in its entirety.

BACKGROUND

In many hydrocarbon well applications, a wellbore is drilled with a drilling assembly delivered downhole on a drill string. A deviated or directional wellbore may be drilled with a rotary steerable drilling system by controlling the delivery of drilling mud to a plurality of actuator pistons positioned on the steerable drilling system. The delivery of drilling mud is controlled by a valve system having a valve stator and a valve rotor which rotate relative to each other to control the flow of drilling mud to individual actuator pistons of the plurality of actuator pistons.

SUMMARY

In general, a technique is provided for delivering high pressure actuating fluid, e.g. drilling mud, to a plurality of actuators. The technique employs a valve system having a stable valve configuration in which high pressure actuating fluid is delivered from inside a rotor to outer stator ports on a surrounding stator. The construction and arrangement of the rotor and stator reduces the inherent instability and susceptibility to sticking that can otherwise affect the operation of the valve.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The present disclosure generally relates to a technique for delivering high pressure actuating fluid, e.g. drilling mud, to a plurality of actuators. The technique employs unique valve gates and/or a valve system in the form of a stable, low torque valve unit in which a balanced pressure distribution is maintained. In certain embodiments, high pressure actuating fluid is delivered from inside a rotor to outer stator ports on a surrounding stator. The construction and arrangement of the rotor and stator reduces the inherent instability and susceptibility to sticking that can otherwise affect the operation of the valve. The valve system may be constructed with concentric cylindrical surfaces on the rotor and the stator.

In conventional systems, the internal rotor tends to stick as soon as there is eccentricity in the position of the rotor relative to the stator. The sticking tendency results from a pressure drop in the clearance around the rotor. Maintaining a close fit between the components of the valve creates ducts with variable geometry that generate a different pressure distribution on one side of the rotor relative to the other, thus generating a net force that causes the rotor to stick within the stator.

Certain embodiments described herein remove the stability problems for valves having a high pressure inlet on the inside by supporting a rotor on pads. The pads may be located around the flow ports and/or at other suitable locations to provide a relatively large clearance and a uniform pressure between the rotor and the stator. At least some of the pads have passages, e.g. sealed passages, which enable channels in the rotor to supply high-pressure fluid to annular collecting chambers in the stator.

Figure 1:
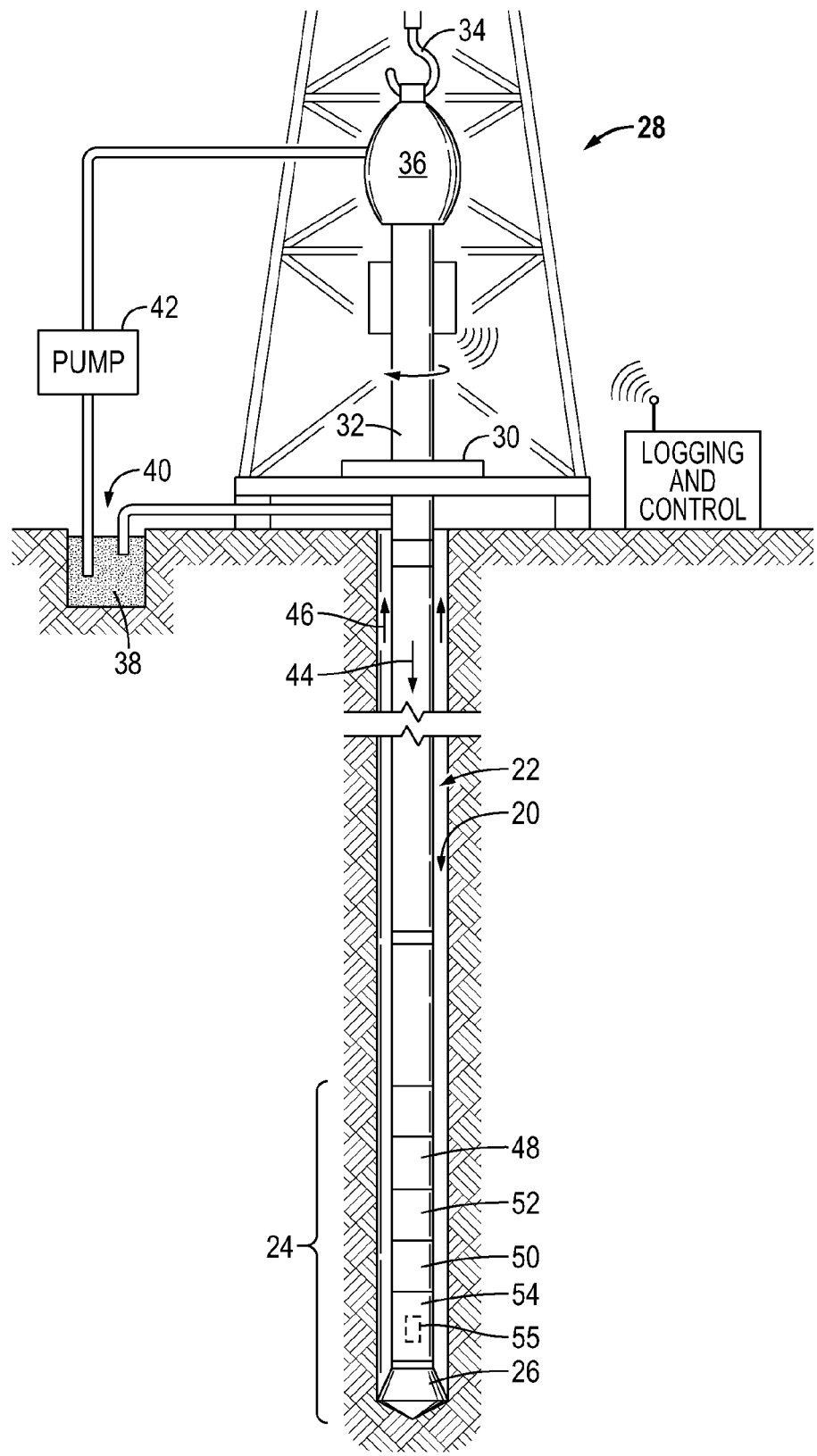
FIG. 1 is a schematic view of an example of a well system having a drill string deployed in a wellbore, according to an embodiment of the disclosure.

Referring generally to FIG. 1, an example of a wellsite system is illustrated in which embodiments described herein may be employed. The wellsite may be onshore or offshore. In a wellsite system, a borehole 20 is formed in a subsurface formation, e.g. an oil-bearing subsurface formation, by drilling. The method of drilling to form the borehole 20 may include, but is not limited to, rotary and directional drilling. A drill string 22 is suspended within the borehole 20 and has a bottom hole assembly (BHA) 24 that includes a drill bit 26 at its lower end.

An embodiment of a surface system includes a platform and derrick assembly 28 positioned over the borehole 20. An example of assembly 28 includes a rotary table 30, a kelly 32, a hook 34 and a rotary swivel 36. The drill string 22 is rotated by the rotary table 30, energized by a suitable system (not shown) which engages the kelly 32 at the upper end of the drill string 22. The drill string 22 is suspended from the hook 34, attached to a traveling block (not shown) through the kelly 32 and the rotary swivel 36 which permits rotation of the drill string 22 relative to the hook 34. A top drive system could be used in other embodiments.

An embodiment of the surface system also includes an actuating/drilling fluid 38, e.g., drilling mud, stored in a pit 40 formed at the wellsite. A pump 42 delivers the drilling fluid 38 to the interior of the drill string 22 via one or more ports in the swivel 36, causing the drilling fluid to flow downwardly through the drill string 22 as indicated by directional arrow 44. The drilling fluid 38 exits the drill string 22 via one or more ports in the drill bit 26, and then circulates upwardly through the annulus region between the outside of the drill string 22 and the wall of the borehole, as indicated by directional arrows 46. In this manner, the drilling fluid lubricates the drill bit 26 and carries formation cuttings and particulate matter up to the surface as it is returned to the pit 40 for recirculation.

The illustrated embodiment of bottom hole assembly 24 includes one or more logging-while-drilling (LWD) modules 48/50, one or more measuring-while-drilling (MWD) modules 52, one or more roto-steerable systems and motors (not shown), and the drill bit 26. It will also be understood that more than one LWD module and/or more than one MWD module may be employed in various embodiments, e.g. as represented at 48 and 50.

The LWD module 48/50 is housed in a type of drill collar, and includes capabilities for measuring, processing, and storing information, as well as for communicating with the surface equipment. The LWD module 48/50 also may include a pressure measuring device and one or more logging tools.

The MWD module 52 also is housed in a type of drill collar, and includes one or more devices for measuring characteristics of the drill string 22 and drill bit 26. The MWD module 52 also may include one or more devices for generating electrical power for the downhole system. In an embodiment, the power generating devices include a mud turbine generator (also known as a "mud motor") powered by the flow of the drilling fluid. In other embodiments, other power and/or battery systems may be employed to generate power.

The MWD module 52 also may include one or more of the following types of measuring devices: a weight-on-bit measuring device, a torque measuring device, a vibration measuring device, a shock measuring device, a stick slip measuring device, a direction measuring device, and an inclination measuring device.

In an operational example, the wellsite system of FIG. 1 is used in conjunction with controlled steering or "directional drilling." Directional drilling is the intentional deviation of the wellbore from the path it would naturally take. In other words, directional drilling is the steering of the drill string 22 so that it travels in a desired direction. Directional drilling is, for example, useful in offshore drilling because it enables multiple wells to be drilled from a single platform. Directional drilling also enables horizontal drilling through a reservoir. Horizontal drilling enables a longer length of the wellbore to traverse the reservoir, which increases the production rate from the well.

A directional drilling system also may be used in vertical drilling operation. Often the drill bit will veer off of a planned drilling trajectory because of the unpredictable nature of the formations being penetrated or the varying forces that the drill bit experiences. When such a deviation occurs, a directional drilling system may be used to put the drill bit back on course.

Directional drilling may employ the use of a rotary steerable system ("RSS"). In an embodiment that employs the wellsite system of FIG. 1 for directional drilling, a steerable tool or system 54 is provided. The steerable tool 54 may comprise an RSS. In an RSS, the drill string may be rotated from the surface and/or from a downhole location, and downhole devices cause the drill bit to drill in the desired direction. Rotating the drill string greatly reduces the occurrences of the drill string getting hung up or stuck during drilling. Rotary steerable drilling systems for drilling deviated boreholes into the earth may be generally classified as either "point-the-bit" systems or "push-the-bit" systems.

In an example of a "point-the-bit" rotary steerable system, the axis of rotation of the drill bit is deviated from the local axis of the bottom hole assembly in the general direction of the new hole. The hole is propagated in accordance with the customary three-point geometry defined by upper and lower stabilizer touch points and the drill bit. The angle of deviation of the drill bit axis coupled with a finite distance between the drill bit and lower stabilizer results in the non-collinear condition for a curve to be generated. This may be achieved in a number of different ways, including a fixed bend at a point in the bottom hole assembly close to the lower stabilizer or a flexure of the drill bit drive shaft distributed between the upper and lower stabilizer. In its idealized form, the drill bit does not have to cut sideways because the bit axis is continually rotated in the direction of the curved hole. Examples of "point-the-bit" type rotary steerable systems and their operation are described in U.S. Pat. Nos. 6,394,193; 6,364,034; 6,244,361; 6,158,529; 6,092,610; and 5,113,953; and U.S. Patent Application Publication Nos. 2002/0011359 and 2001/0052428.

In an example of a "push-the-bit" rotary steerable system, there is no specially identified mechanism that deviates the bit axis from the local bottom hole assembly axis. Instead, the non-collinear condition is achieved by causing either or both of the upper or lower stabilizers to apply an eccentric force or displacement in a direction that is orientated with respect to the direction of hole propagation. This may be achieved in a number of different ways, including non-rotating (with respect to the hole) eccentric stabilizers (displacement based approaches) and eccentric actuators that apply force to the drill bit in the desired steering direction. Steering is achieved by creating non co-linearity between the drill bit and at least two other touch points. In its idealized form, the drill bit does not have to cut sideways to generate a curved hole. Examples of "push-the-bit" type rotary steerable systems and their operation are described in U.S. Pat. Nos. 6,089,332; 5,971,085; 5,803,185; 5,778,992; 5,706,905; 5,695,015; 5,685,379; 5,673,763; 5,603,385; 5,582,259; 5,553,679; 5,553,678; 5,520,255; and 5,265,682.

Figure 2:
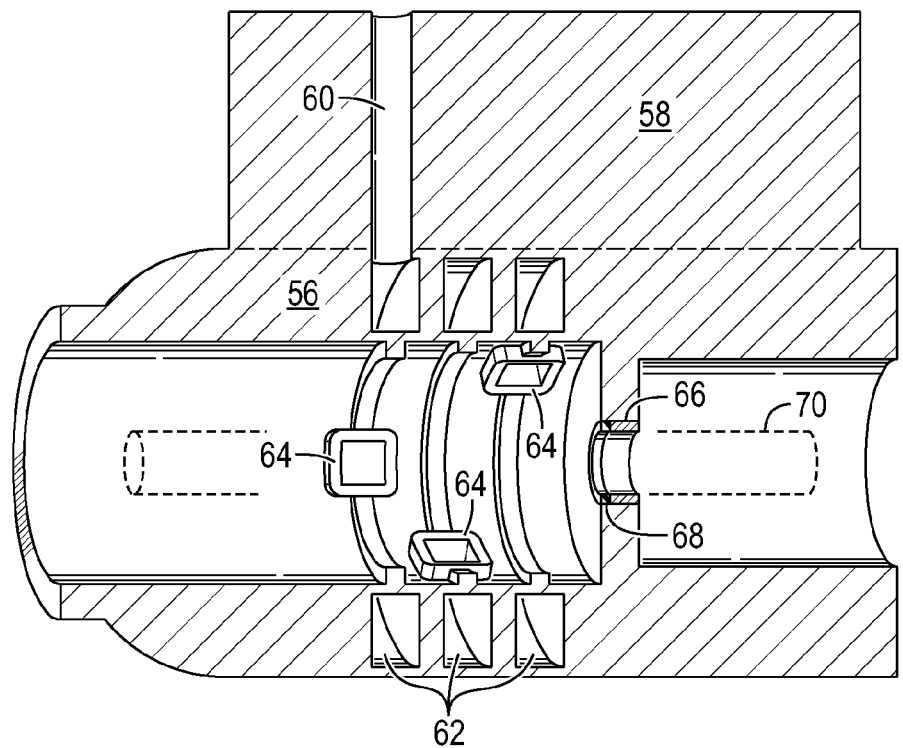
FIG. 2 is a cross-sectional view of an example of a valve system having a stator and a cooperating structure with a fluid flow passages, according to an embodiment of the disclosure.

In some applications, the steerable system 54, e.g. rotary steerable system, comprises actuators 55 which are operated via actuating/drilling fluid 38 to push against a surrounding wellbore wall or sleeve so as to push or point the drill bit 26 in a desired drilling direction. Referring generally to FIG. 2, an example of a stator 56 is illustrated as positioned adjacent a valve system structure 58 having outlet ducts 60 that enable controlled delivery of actuating fluid 38 to actuators 55 of, for example, rotary steerable system 54. The stator 56 comprises a plurality of collecting chambers 62, e.g. annular collecting chambers, fluidly coupled with a plurality of corresponding stator flow ports 64. The stator 56 also may comprise a bearing 66 and a corresponding bearing seal 68 for receiving a rotor shaft 70 (see also FIG. 3).

Figure 3:
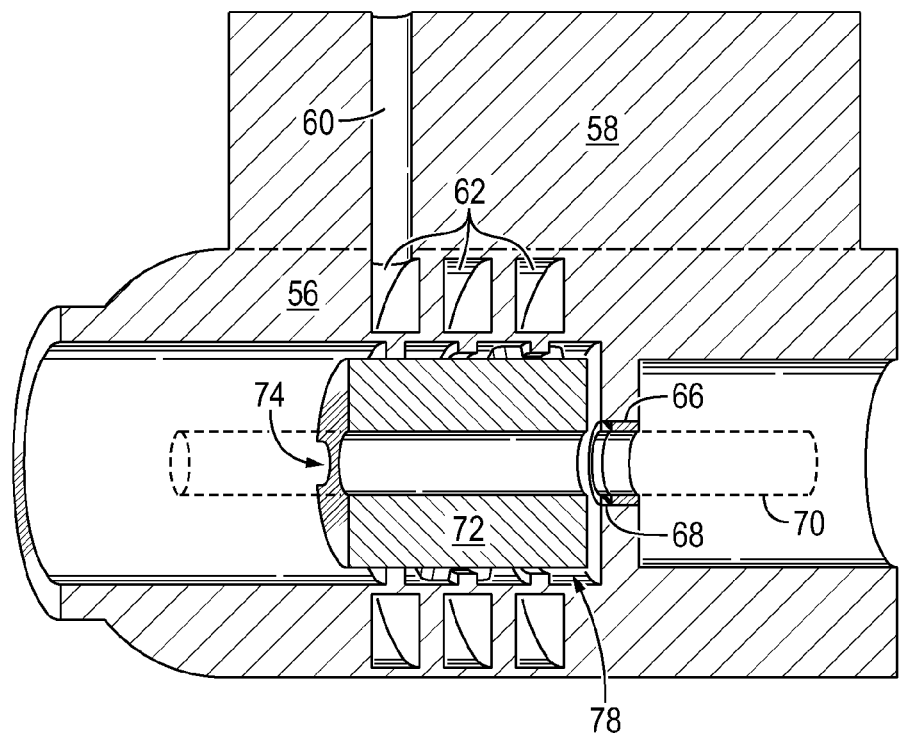
FIG. 3 is a cross-sectional view of the stator illustrated in FIG. 2 with the addition of an example of a rotor rotatably received in the stator, according to an embodiment of the disclosure.

In FIG. 3, a rotor 72 is illustrated as rotatably received in the stator 56. The rotor 72 receives actuating fluid 38, e.g. drilling mud, under pressure via, for example, an internal passage 74. The pressurized actuating fluid 38 is delivered out through rotor ports 76 (see also FIG. 6) when specific rotor ports 76 are aligned with certain corresponding stator flow ports 64 to deliver the actuating fluid to select steering actuators 55. The rotor 72 is sized to provide a relatively large clearance 78 between an outer surface of the rotor 72 and an inner surface of the stator 56. In this example, both the rotor 72 and the stator 56 may be generally cylindrical and concentrically positioned.

Figure 4:
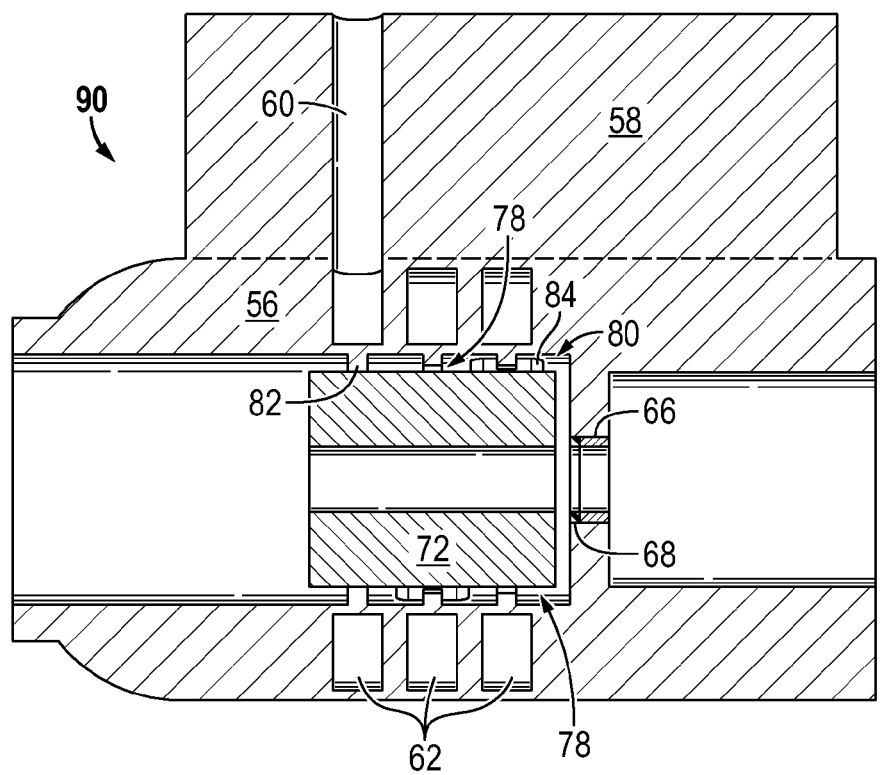
FIG. 4 is a cross-sectional view of the stator illustrated in FIG. 3 with the addition of an example of support pads positioned to support the rotor within the stator, according to an embodiment of the disclosure.
Figure 5:
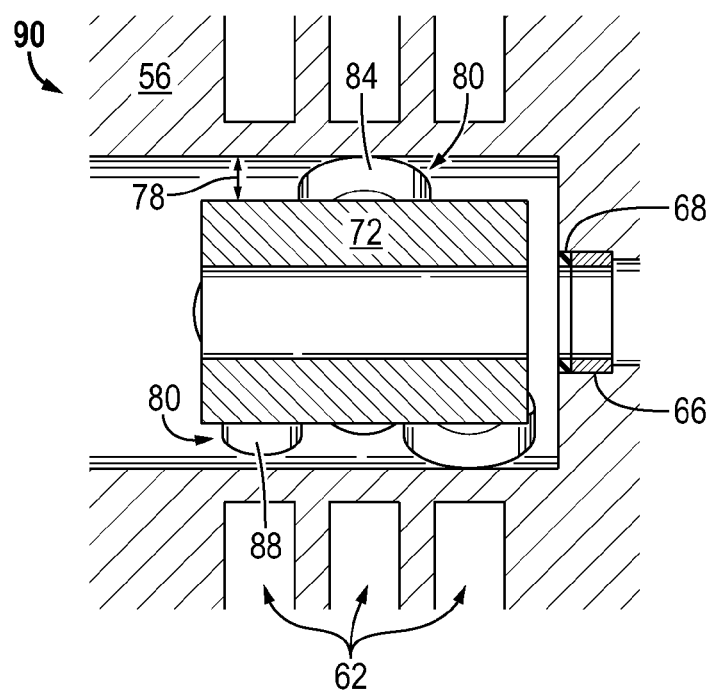
FIG. 5 is a cross-sectional view of another example of a valve system, according to an embodiment of the disclosure.
Figure 6:
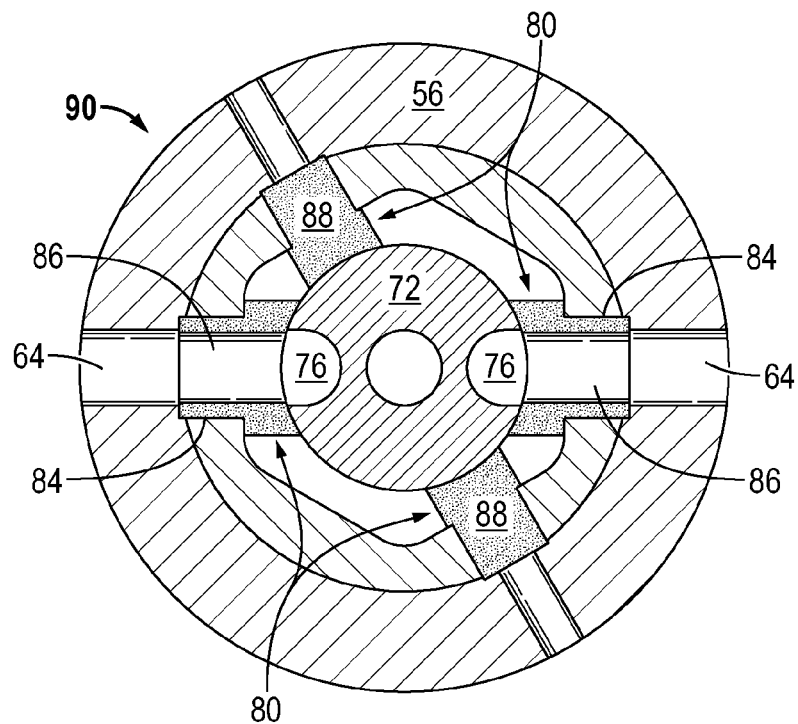
FIG. 6 is a cross-sectional view taken along a plane perpendicular to an axis of the valve system illustrated in FIG. 5, according to an embodiment of the disclosure.

As further illustrated in FIGS. 4-6, the rotor 72 may be rotatably supported within stator 56 by a plurality of pads 80 which maintain the relatively large clearance 78 between the rotor 72 and the stator 56. The pads 80 may have a variety of forms and may comprise, for example, ribs 82, positioned adjacent each stator flow port 64, or inserts 84 similarly positioned at corresponding stator flow ports 64. By way of example, the inserts 84 may be located around the corresponding stator flow ports 64 and may have internal flow passages 86 through which actuating fluid 38 flows to the corresponding outlet ducts 60, as illustrated in FIG. 6. However, the pads 80 also may comprise solid, intermediate rotor supports 88.

Although rotor 72 is supported by shaft 70 and corresponding bearings 66, the pads 80, e.g. ribs 82, inserts 84 and/or supports 88, provide additional support which can reduce the torque rating of the rotor. The various pads 80 may be provided at different angular locations, thus ensuring maintenance of the relatively large clearance 78 between rotor 72 and stator 56. The various pads 80 also may comprise discrete raised areas which are independent of, for example, ribs 82 or inserts 84. The inserts 84 and supports 88 also may be positioned to provide discrete supports. The various pads 80 may be formed of a hard material or a hardened surface, e.g. a diamond surface component as often used in PDC drill bits. In some applications, the pads 80 may be formed from modified PDC cutters.

In the embodiment illustrated in FIGS. 5 and 6, the stator 56 has a flattened inner profile to facilitate placing and sealing of the support elements, i.e. pads 80. The construction also may employ an asymmetric support structure to enable compactness. The support structure may have a greater or lesser number of facets than illustrated depending on a variety of factors, such as the number of actuators 55 that are served by the valve and on packaging limitations. Additionally, different numbers of the support structure facets may be provided with support pads 80.

The illustrated example utilizes rotor 72 in the form of a solid rotor made of an erosion resistant material, e.g. a PDC or other diamond-based material. The shaft 70 also may be covered with this harder type of material to protect it from high velocity flow. Furthermore, the solid rotor 72 is surrounded by a constant fluid pressure via clearance 78. These attributes protect the rotor 72 from fatigue failure due to pressure cycling which can have a greater detrimental effect on a hollow, cylindrical rotor.

Depending on the application, the gating between rotor 72 and stator 56 may have several types of configurations. In other words, the cooperating rotor ports 76 and the stator flow ports 64 may have a variety of configurations. Different edge geometries can be provided to improve performance with respect to, for example, jamming which can result from particles and fibers in the flow of actuating fluid.

Figure 7:
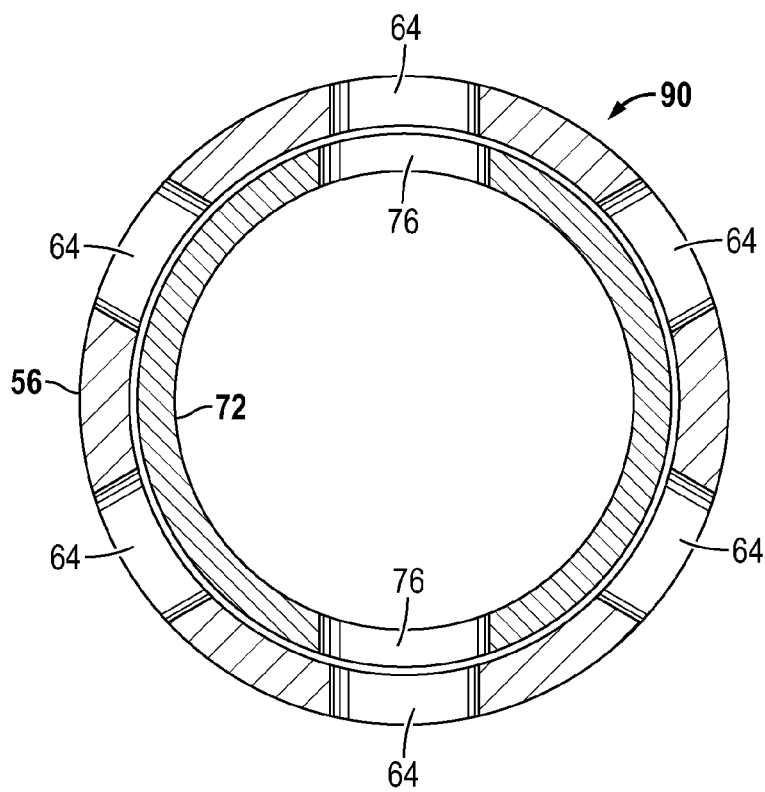
FIG. 7 is a cross-sectional view of an example of a valve system comprising a stator and a rotor with flow ports having an improved configuration, according to an embodiment of the disclosure.

Referring generally to FIGS. 7-14, examples of unique port geometries for a valve 90, e.g. a barrel valve, having a generally cylindrical stator 56 and a generally cylindrical rotor 72 are illustrated. As represented in FIG. 7, the unique port geometries may be used in valve systems in which tight clearances exist between the rotor 72 and the surrounding stator 56. However, the unique port geometries also are very useful in embodiments having a relatively large clearance 78 between the rotor 72 and stator 56, as with the embodiments illustrated in FIGS. 2-6. In the example illustrated in FIG. 7, the rotor 72 rotates relative to the stator 56 within the stator 56 to selectively align rotor ports 76 with stator flow ports 64 so as to enable flow of pressurized actuating fluid 38 through the desired outlet ducts 60.

Figure 8:
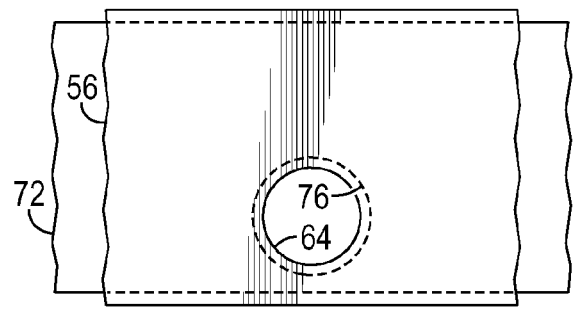
FIG. 8 is a schematic illustration of another example of a valve system having a stator and a rotor with flow ports, according to an embodiment of the disclosure.
Figure 9:
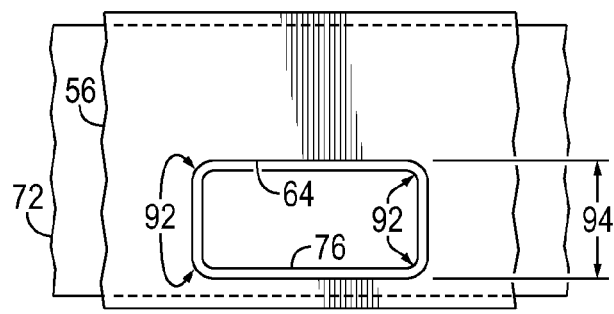
FIG. 9 is a schematic illustration of another example of a valve system comprising a stator and a rotor with flow ports having an improved configuration, according to an embodiment of the disclosure.
Figure 10:
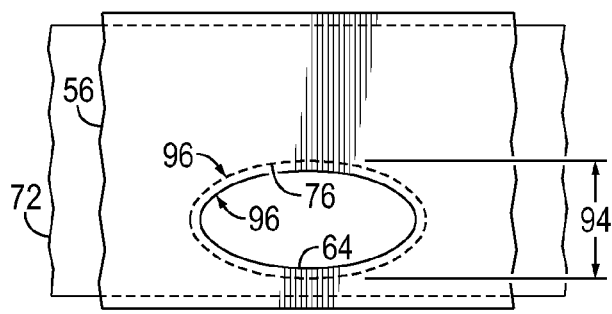
FIG. 10 is a schematic illustration of another example of a valve system comprising a stator and a rotor with flow ports having an improved configuration, according to an embodiment of the disclosure.

Although rotor ports 76 and stator flow ports 64 may be generally circular, as illustrated in FIG. 8, many embodiments utilize non-circular ports. In some applications, either the rotor ports 76 or the stator flow ports 64 are circular while the other set of ports has a different configuration. In the embodiment illustrated in FIG. 9, for example, both the rotor ports 76 and the stator flow ports 64 are elongated and have a generally rectangular shape with arcuate, e.g. rounded, corners 92. In this example, each of the ports 64, 76 has a relatively shorter axial extent 94. However, the elongation of both ports 64 and ports 76 provides a greater flow area and a reduced susceptibility to blockage even if the axial extent 94 is comparable to a corresponding circular port.

Figure 11:
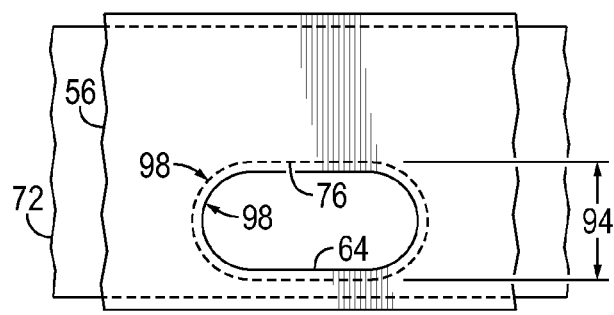
FIG. 11 is a schematic illustration of another example of a valve system comprising a stator and a rotor with flow ports having an improved configuration, according to an embodiment of the disclosure.

Slots or other types of ports 64, 76 with sharp corners, i.e. corners with small radii, can offer greater flow area for a given axial and angular extent, but such sharp corners can sometimes present an undesirable stress concentration. The stress concentration can lead to fatigue cracking, particularly where diamond-based material is the material forming the contacting surface. In such applications, the ports 64, 76 may be formed with more rounded features, such as the elliptical form illustrated in FIG. 10 which has a gently rounded elliptical contour 96. In other applications, the ports 64, 76 may be formed as elongated slots having rounded ends 98, as illustrated in FIG. 11.

In this latter configuration, the peak erosion location is at the apex of each of the rounded, e.g. circular, ends where material may be lost without greatly impacting the distance to the next high-pressure zone. Consequently, such erosion has little effect on the leakage performance of the valve 90 when in the closed position. However, this region also can be the peak stress region for the material with respect to hoop stress. The peak erosion point occurs where fluid first starts to flow, i.e. where the valve 90 first starts to open, given rotation in the left to right sense illustrated in these figures. In these examples, the fluid first starts to flow at the apex of the elliptical contour 96 or at rounded ends 98.

Figure 12:
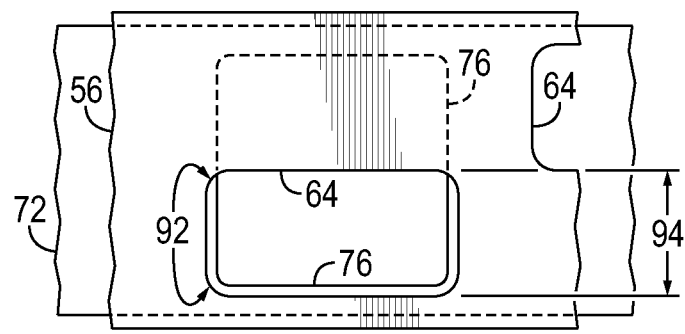
FIG. 12 is a schematic illustration of another example of a valve system comprising a stator and a rotor with flow ports having an improved configuration, according to an embodiment of the disclosure.
Figure 13:
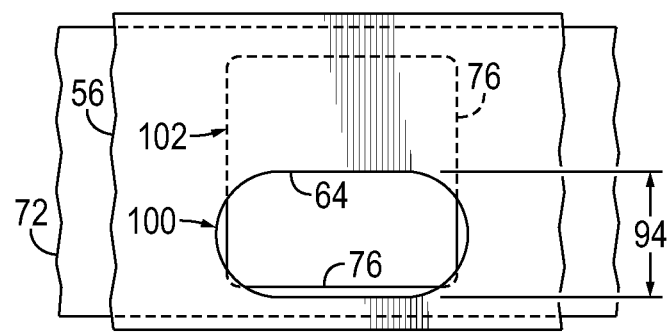
FIG. 13 is a schematic illustration of another example of a valve system comprising a stator and a rotor with flow ports having an improved configuration, according to an embodiment of the disclosure.
Figure 14:
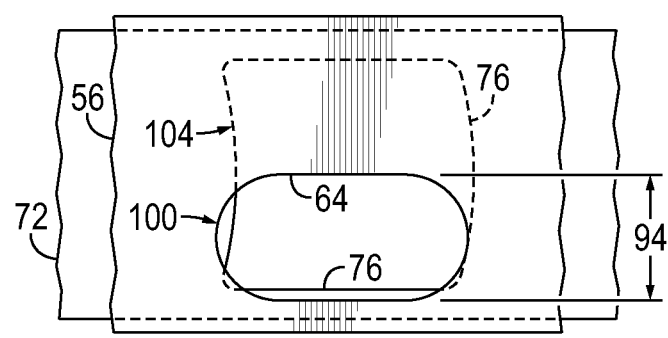
FIG. 14 is a schematic illustration of another example of a valve system comprising a stator and a rotor with flow ports having an improved configuration, according to an embodiment of the disclosure.

In some applications, the rotor ports 76 and the stator flow ports 64 are geometrically similar, but in other applications they may be different, as illustrated in the embodiments of FIGS. 12-14. For example, the rotating element, e.g. rotor 72, may have a single elongated slot type port 76 that exposes a smaller corresponding port in the static element, e.g. a smaller corresponding stator flow port 64 in stator 56. The angle of coverage of the ports 64, 76 also may be different for reasons of timing the output.

Whether the rotor ports 76 and stator flow ports 64 are matched in size or mismatched but with straight sides, the edges of the corresponding ports 76, 64 meet across a full width of the slot at the same instant. However, having the edges meet across a substantially full width of the slot can increase the potential for jamming if particles or fibers are present in the actuating fluid. The edges tend to fold under the fibers rather than cutting through the fibers. In some applications, the port geometry can be changed to reduce this potential for jamming.

For example, the stator flow ports 64 may be formed as elongated slots with rounded or otherwise suitably arcuate ends 100, as illustrated in FIGS. 13 and 14. In this example, the rounded end, elongated stator ports 64 work in cooperation with rotor ports 76 having long straight edges 102, as illustrated in FIG. 13, so as to reduce the potential for jamming. However, other embodiments may provide rotor ports 76 with curved edges 104, as illustrated in FIG. 14. The curved edges 104 may be formed as single or compound curves. Additionally, the edges 102, 104 may be formed as angled edges where, for example, a single long slot type port is used. The various combinations of port edge geometries are selected to provide continuously moving contact points rather than generating a contact line. This approach reduces the potential for jamming by deflecting particles from the region of contact between port edges. Similar to the actuation of a scissors, the structure also facilitates cutting or crushing of particles and/or fibers as the port edges move past each other.

Depending on the application, the valve 90 may comprise a variety of rotors 72 and stators 56 for use in well related and non-well related applications. Additionally, the valve 90 may be used with a variety of steerable systems in which various actuators 55 are operated via actuating fluid 38 to facilitate drilling along a desired trajectory. However, the various embodiments of valve 90 may be used in a variety of steering applications as well as a variety of other types of applications in which control over high-pressure actuating fluid is desired.

Furthermore, the rotor 72 and stator 56 may utilize various numbers and configurations of ports and flow passages. The rotor 72 also may be rotatably mounted with respect to stator 56 on a variety of bearings and/or support pads depending on whether tight tolerances are desired or whether substantial clearance is desired between the rotor and the stator. The components also may be made from a variety of materials suitable for the environment in which the valve is operated. Similarly, many types of control systems may be used for controlling the relative motion of the rotor 72 with respect to the stator 56.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for distributing actuating fluid in a rotary steerable system, comprising:
   a stator having a plurality of collecting chambers fluidly coupled with a plurality of flow ports;
   a rotor rotatably received in the stator, the rotor receiving actuating fluid under pressure and having rotor ports which may be aligned with specific flow ports to deliver actuating fluid to select steering actuators; and
   a plurality of pads disposed between the rotor and the stator to establish a clearance between the rotor and the stator, the clearance providing a uniform pressure between the rotor and the stator during delivery of the actuating fluid, the rotor being rotatably supported by the plurality of pads.

2. The system as recited in claim 1, wherein the plurality of pads comprises a plurality of ribs.

3. The system as recited in claim 1, wherein the plurality of pads comprises a plurality of inserts.

4. The system as recited in claim 3, wherein at least some inserts of the plurality of inserts are positioned around the flow ports and have flow passages through which the actuating fluid flows.

5. The system as recited in claim 1, wherein the rotor is mounted on a shaft which is rotatably received in a bearing mounted in the stator.

6. A system for distributing actuating fluid, comprising:
   a stator having a cylindrical interior with stator flow ports;
   a rotor in the form of a cylinder rotatably received in the stator, the rotor having rotor flow ports which may be selectively aligned with the stator flow ports by rotating the rotor relative to the stator, the stator flow ports and the rotor flow ports having different port edge geometries to provide continuously moving contact points rather than generating a contact line during rotation of the rotor within the stator; and
   a plurality of pads extending radially between the rotor and the stator to support the rotor within the stator in a manner establishing a clearance between the rotor and the stator,
   wherein the stator and the rotor are disposed in a rotary steerable system.

7. The system as recited in claim 6, wherein the stator flow ports have a different configuration than the rotor flow ports.

8. The system as recited in claim 6, wherein the stator flow ports have a different size than the rotor flow ports.

9. The system as recited in claim 6, wherein the stator flow ports and the rotor flow ports are generally rectangular with arcuate corners.

10. The system as recited in claim 6, wherein the stator flow ports and the rotor flow ports are generally elliptical.

11. The system as recited in claim 6, wherein the stator flow ports and the rotor flow ports are generally in the form of slots with rounded ends.

12. The system as recited in claim 6, wherein the rotor flow ports and the stator flow ports are in the form of slots having edges which meet across a full width of the slot.

13. The system as recited in claim 6, wherein the rotor flow ports and the stator flow ports are constructed to have continuously moving contact points as the rotor and the stator undergo relative rotation.

14. A method, comprising:
providing a stator with a plurality of collecting chambers fluidly coupled with a plurality of flow ports;
rotatably positioning a rotor in the stator;
establishing a radial clearance between the rotor and the stator via a plurality of pads extending radially between the rotor and the stator;
delivering actuating fluid to select steering actuators by causing relative rotation between the rotor and the stator to selectively align rotor ports of the rotor with specific flow ports of the stator;
supporting the rotor rotatably on the plurality of pads to maintain the radial clearance between the rotor and the stator; and
controlling a drilling direction of a rotary steerable system by the delivering the actuating fluid to the select steering actuators.

15. The method as recited in claim 14, further comprising mounting the rotor on a shaft which is rotatably received by a bearing in the stator.

16. The method as recited in claim 14, further comprising constructing the plurality of pads as a plurality of ribs.

17. The method as recited in claim 14, further comprising constructing the plurality of pads as a plurality of inserts.

18. The method as recited in claim 17, further comprising forming the plurality of inserts with flow passages through which the actuating fluid flows and positioning at least some inserts of the plurality of inserts around the flow ports.

19. The method as recited in claim 14, wherein controlling comprises controlling the drilling direction to form a borehole in a subterranean, oil-bearing formation.

* * * * *